(12) United States Patent
Song et al.

(10) Patent No.: US 11,249,844 B2
(45) Date of Patent: Feb. 15, 2022

(54) MEMORY SYSTEM AND MEMORY MODULE

(71) Applicant: SK hynix Inc., Gyeonggi-do (KR)

(72) Inventors: Young-Ook Song, Seoul (KR); Hyun-Seok Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 63 days.

(21) Appl. No.: 16/668,740

(22) Filed: Oct. 30, 2019

(65) Prior Publication Data

US 2020/0201709 A1 Jun. 25, 2020

(30) Foreign Application Priority Data

Dec. 24, 2018 (KR) .................. 10-2018-0168074

(51) Int. Cl.
*G06F 11/10* (2006.01)

(52) U.S. Cl.
CPC .............................. *G06F 11/1068* (2013.01)

(58) Field of Classification Search
CPC ............. G06F 11/1044; G06F 11/1048; G06F 11/1068

See application file for complete search history.

(56) References Cited

U.S. PATENT DOCUMENTS

| | | | | |
|---|---|---|---|---|
| 5,313,464 A | * | 5/1994 | Reiff | G06F 11/1028 714/701 |
| 2008/0145064 A1 | * | 6/2008 | Ohira | H03M 13/6561 398/162 |
| 2010/0281341 A1 | * | 11/2010 | Wu | H03M 13/152 714/763 |
| 2011/0066923 A1 | * | 3/2011 | Koshiyama | G06F 11/1068 714/773 |
| 2011/0191654 A1 | * | 8/2011 | Rub | H03M 13/05 714/773 |
| 2013/0332792 A1 | | 12/2013 | Lee et al. | |
| 2018/0150233 A1 | * | 5/2018 | Hanzawa | G11C 29/52 |
| 2018/0278273 A1 | * | 9/2018 | Kifune | G06F 11/1012 |
| 2018/0336092 A1 | * | 11/2018 | Kim | G06F 12/084 |
| 2019/0087266 A1 | * | 3/2019 | Watanabe | H03M 13/2909 |

FOREIGN PATENT DOCUMENTS

KR  10-2018-0051706  5/2018

* cited by examiner

*Primary Examiner* — Steve N Nguyen
(74) *Attorney, Agent, or Firm* — IP & T Group LLP

(57) ABSTRACT

A memory system includes: an error correction code generation circuit suitable for generating an error correction code including one or more symbols for write data including a plurality of symbols, to output a codeword including the write data and the error correction code; a first data mapping circuit suitable for mapping the symbols of the codeword to a dataword; and a memory suitable for storing the dataword.

15 Claims, 4 Drawing Sheets

| | DQ0 | DQ1 | DQ2 | DQ3 |
|---|---|---|---|---|
| BL0 | | | | |
| BL1 | | | | |
| BL2 | | | | |
| BL3 | 68-th Symbol | 69-th Symbol | 70-th Symbol | 71-th Symbol |
| BL4 | | | | |
| BL5 | | | | |
| BL6 | | | | |
| BL7 | | | | |

• • •

131

| | DQ0 | DQ1 | DQ2 | DQ3 |
|---|---|---|---|---|
| BL0 | | | | |
| BL1 | | | | |
| BL2 | | | | |
| BL3 | 0-th Symbol | 1-th Symbol | 2-th Symbol | 3-th Symbol |
| BL4 | | | | |
| BL5 | | | | |
| BL6 | | | | |
| BL7 | | | | |

FIG. 3

| | DQ0 | DQ1 | DQ2 | DQ3 |
|---|---|---|---|---|
| BL0 | | 0-th Symbol | | |
| BL1 | | | | |
| BL2 | | 1-th Symbol | | |
| BL3 | | | | |
| BL4 | | 2-th Symbol | | |
| BL5 | | | | |
| BL6 | | 3-th Symbol | | |
| BL7 | | | | |

131

⋮

| | DQ0 | DQ1 | DQ2 | DQ3 |
|---|---|---|---|---|
| BL0 | | 68-th Symbol | | |
| BL1 | | | | |
| BL2 | | 69-th Symbol | | |
| BL3 | | | | |
| BL4 | | 70-th Symbol | | |
| BL5 | | | | |
| BL6 | | 71-th Symbol | | |
| BL7 | | | | |

| | DQ0 | DQ1 | DQ2 | DQ3 |
|---|---|---|---|---|
| BL0 | ///// | ///// | ///// | ///// |
| BL1 | | | | |
| BL2 | | | | |
| BL3 | | | | |
| BL4 | | | | |
| BL5 | | | | |
| BL6 | | | | |
| BL7 | | | | |

FIG. 5

| | DQ0 | DQ1 | DQ2 | DQ3 |
|---|---|---|---|---|
| BL0 | ///// | | | |
| BL1 | ///// | | | |
| BL2 | ///// | | | |
| BL3 | ///// | | | |
| BL4 | ///// | | | |
| BL5 | ///// | | | |
| BL6 | ///// | | | |
| BL7 | ///// | | | |

MEMORY SYSTEM AND MEMORY MODULE

CROSS-REFERENCE TO RELATED APPLICATIONS

The present application claims priority of Korean Patent Application No. 10-2018-0168074, filed on Dec. 24, 2018, which is incorporated herein by reference in its entirety.

BACKGROUND

1. Field

Exemplary embodiments of the present invention relate to a memory system.

2. Description of the Related Art

In the early days of the semiconductor memory industry, there used to be a number of original good dies, in which there are no defective memory cells, on a wafer of a memory chip that passes through a semiconductor fabrication process. However, as the capacity of memory devices gradually increases, it became more difficult to fabricate a memory device which is completely free of defective memory cells. Currently, it may be considered that there is almost no possibility that such a memory device which is completely free of defective memory cells can be fabricated. One solution to overcome this situation is a method of repairing defective memory cells of a memory device with redundant memory cells.

Another solution is to correct an error occurring in a memory cell and an error occurring while data are transferred during a read operation and a write operation of a memory system by using an error correction code (ECC) circuit for correcting an error in a memory system.

SUMMARY

Embodiments of the present invention are directed to technology that increases error correction efficiency in a memory system.

In accordance with an embodiment of the present invention, a memory system includes: an error correction code generation circuit suitable for generating an error correction code including one or more symbols for write data including a plurality of symbols, to output a codeword including the write data and the error correction code; a first data mapping circuit suitable for mapping the symbols of the codeword to a dataword; and a memory suitable for storing the dataword.

In accordance with another embodiment of the present invention, a memory module includes: an error correction code generation circuit suitable for generating an error correction code including one or more symbols for write data including a plurality of symbols to output a codeword including the write data and the error correction code; a first data mapping circuit suitable for mapping the plurality of symbols in the codeword to a dataword; and a plurality of memory chips suitable for storing the dataword.

In accordance with still another embodiment of the present invention, a memory module includes: an error correction code (ECC) encoding circuit suitable for receiving write data and generating an error correction code for the write data to output a codeword including the write data and the error correction code; a data mapping circuit suitable for mapping the codeword to a dataword according to a first mapping method; a memory suitable for storing the dataword; and a mapping controller suitable for detecting errors of the dataword, which is read from the memory and controlling the data mapping circuit to change the first mapping method into a second mapping method based on the detecting result.

BRIEF DESCRIPTION OF THE DRAWINGS

FIGS. 2 and 3 illustrate patterns of symbols of a codeword mapped to a dataword.

FIGS. 4 and 5 illustrate patterns of errors that occur in a memory chip of a memory.

DETAILED DESCRIPTION

Figure 1:
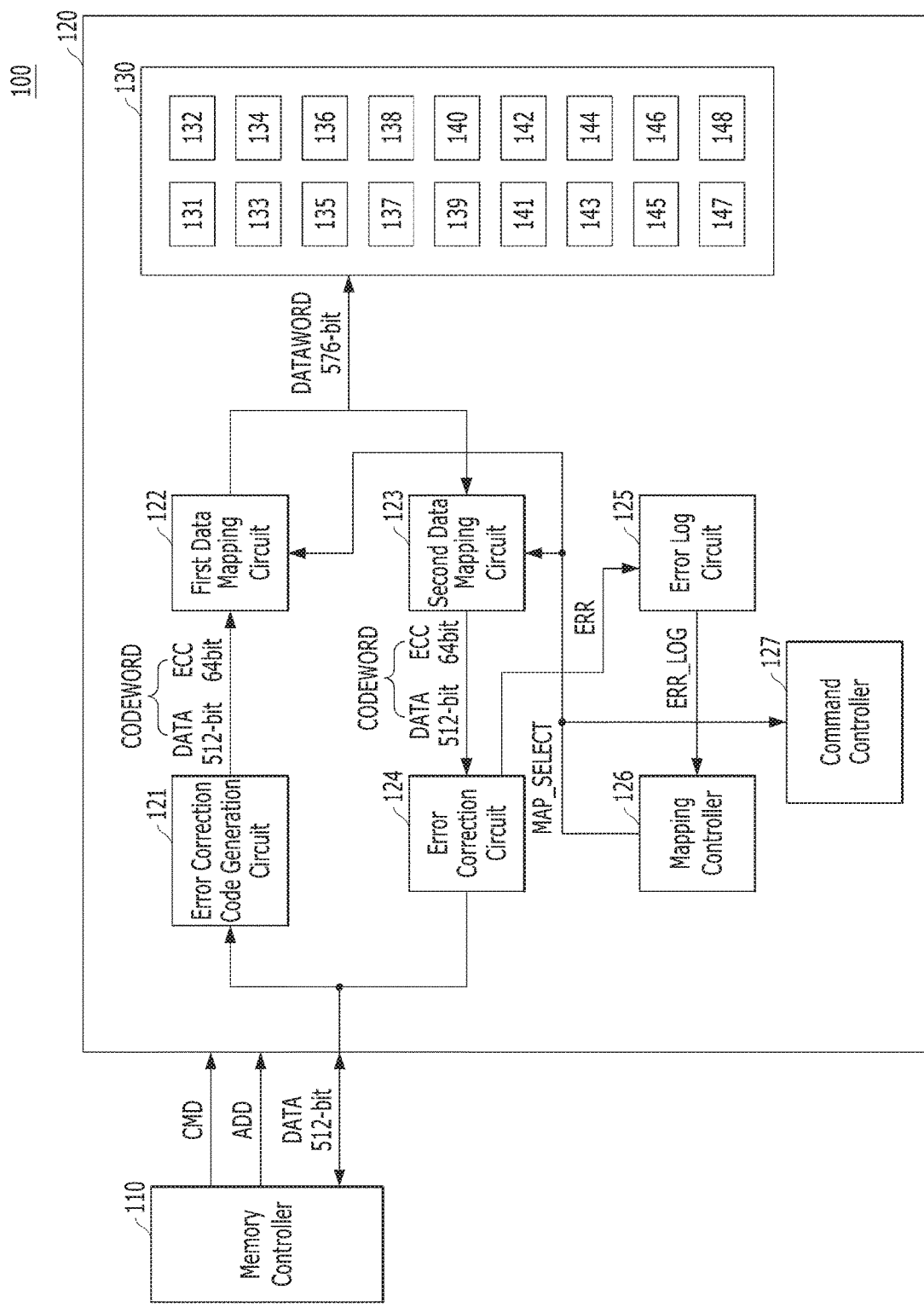
FIG. 1 is a block diagram illustrating a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a memory system 100 in accordance with an embodiment of the present invention. It is noted that FIG. 1 shows only portions directly related to data transfer and error correction in the memory system 100.

Referring to FIG. 1, the memory system 100 may include a memory controller 110 and a memory module 120.

The memory controller 110 may control the memory module 120 based on a command CMD and an address ADD. The memory controller 110 may transfer and receive data DATA to and from the memory module 120. In a write operation, data DATA may be transferred from the memory controller 110 to the memory module 120. In a read operation, data DATA may be transferred from the memory module 120 to the memory controller 110. For example, the unit of the data DATA processed in the memory system 100 may be 512 bits. In other words, 512 bits of data may be transferred from the memory controller 110 to the memory module 120 in one write operation, and 512 bits of data may be transferred from the memory module 120 to the memory controller 110 in one read operation. It is also obvious to those skilled in the art to which the present invention pertains that the unit of the data DATA processed in the memory system 100 may be a number of bits other than 512 bits.

The memory module 120 may include an error correction code generation circuit (or an ECC encoder) 121, a first data mapping circuit 122, a second data mapping circuit 123, an error correction circuit (or an ECC decoder) 124, an error log circuit 125, a mapping controller 126, a command controller 127, and a memory 130. The memory module 120 may be a dual in-line memory module (DIMM) type memory module.

During a write operation, the error correction code generation circuit 121 may receive data DATA from the memory controller 110, generate an error correction code (ECC) for the data DATA and output a codeword including the data DATA and the error correction code. The error correction code generation circuit 121 may generate an error correction code according to a symbol-based error correction code generation algorithm. For example, an error correction code of 8 symbols, that is, 64 bits, may be generated by using data DATA of 512 bits, that is 63 symbols each of which is formed of 8 bits. The symbol-based error correction code generation algorithm may be a Reed Solomon (RS) error correction algorithm. The sum of data DATA and the error correction code may be the codeword. In various embodiments, a codeword may include 72 symbols (i.e., 576 bits), which includes data DATA of 64 symbols (i.e., 512 bits) and an error correction code of 8 symbols (i.e., 64 bits).

The memory 130 may store a dataword DATAWORD. The dataword may mean a unit of information including data and an error correction code to be stored in the memory 130 at one time. The size of the dataword DATAWORD may be 576 bits, which is the same as the size of the codeword CODEWORD. The memory 130 may include one or more memory chips. It is illustrated herein that the memory 130 includes 18 memory chips 131 to 148. In this case, the 18 memory chips 131 to 148 may store the dataword DATAWORD and each of the memory chips 131 to 148 may store 32 bits. Each of the memory chips 131 to 148 may form one semiconductor package individually. Alternatively, two or more memory chips may be stacked in one semiconductor package. For example, 18 memory chips 131 to 148 may be included in 18 semiconductor packages. For another example, 18 memory chips 131 to 148 may be included in two semiconductor packages each of which includes nine stacked memory chips.

The first data mapping circuit 122 may map symbols of a codeword CODEWORD to a dataword DATAWORD during a write operation. The mapping method of the first data mapping circuit 122 may be the pattern in which the symbols of the codeword CODEWORD are mapped to the dataword DATAWORD. FIGS. 2 and 3 show patterns in which the symbols of a codeword CODEWORD are mapped to a dataword DATAWORD. In FIGS. 2 and 3, DQ0 to DQ3 of a corresponding memory chip (e.g., the memory chip 131) may represent four data pads of a corresponding memory chip (e.g., the memory chip 131), and BL (Burst Length) 0 to BL7 may represent data transferred to the data pads DQ0 to DQ3. BL0 may denote the first 4-bit data transferred to the data pads DQ0 to DQ3, and BL7 may denote the $8^{th}$ 4-bit data transferred to the data pads DQ0 to DQ3. The data stored in the memory chip 131 may be 32 (=4*8) bits because the memory chip 131 transfers data with a burst length BL of 8 through the four data pads DQ0 to DQ3. Likewise, in FIGS. 2 and 3, each of the memory chips 132 to 148 may transfer 32-bit data.

In accordance with the mapping method of FIG. 2, the 0th to 3rd symbols among the 72 symbols of a codeword CODEWORD may be mapped to the memory chip 131, and it may be seen that one symbol is mapped to correspond to one data pad DQ. For example, the 0th symbol may be mapped to BL0 to BL7 of the data pad DQ0 of the memory chip 131, and the first symbol may be mapped to BL0 to BL7 of the data pad DQ1 of the memory chip 131. Similarly, it may be seen that four symbols are mapped in the memory chips 132 to 148 and one symbol is mapped to one data pad DQ.

In accordance with the mapping method of FIG. 3, the 0th to 3rd symbols among the 72 symbols of a codeword CODEWORD may be mapped to the memory chip 131, and it may be seen that one symbol is mapped to correspond to two burst lengths BL of four data pads DQ0 to DQ3. For example, the 0th symbol may be mapped to correspond to BL0 and BL1 of the four data pads DQ0 to DQ3, and the first symbol may be mapped to correspond to BL2 and BL3 of the four data pads DQ0 to DQ3. Similarly, each symbol may be mapped to correspond to two burst lengths BL of four data pads DQ0 to DQ3 in the memory chips 132 to 148.

Referring to FIG. 2 and FIG. 3, it may be seen that the pattern in which the symbols of a codeword CODEWORD are mapped to a dataword DATAWORD is changed by changing the mapping method of the first data mapping circuit 122. Although two mapping methods are exemplarily illustrated herein, it is obvious to those skilled in the art that more mapping methods may be used.

Referring back to FIG. 1, during a read operation, the second data mapping circuit 123 may map the dataword DATAWORD that is read from the memory 130 to the codeword CODEWORD and transfer it to the error correction circuit 124. In short, the second data mapping circuit 123 may perform an operation which is opposite to that of the first data mapping circuit 122.

During a read operation, the error correction circuit 124 may correct the data DATA in the codeword CODEWORD based on the error correction code ECC in the codeword CODEWORD which is received from the second data mapping circuit 123, and transfer the error-corrected data DATA to the memory controller 110. The error correction circuit 124 may perform an error correction operation on a symbol basis. For example, when a codeword CODEWORD includes 64 symbols of data DATA and 8 symbols of an error correction code ECC, the error correction circuit 124 may be able to correct an error of up to 4 symbols in the codeword CODEWORD. Even if an error occurs in several bits of one symbol, the same processing may be performed according to the symbol-based error correction method. In other words, whether an error of one bit occurs or an error of 8 symbols occurs in one symbol, the error may be corrected the same as the error of one symbol.

The error log circuit 125 may store an error detection history, that is, the error correction history, of the error correction circuit 124. The error log circuit 125 may receive error information ERR from the error correction circuit 124. The error log circuit 125 may store error detection history ERR_LOG based on the error information ERR.

The mapping controller 126 may change the mapping between the first data mapping circuit 122 and the second data mapping circuit 123 based on the error detection history ERR_LOG. The mapping controller 126 may generate a signal MAP_SELECT to control the mapping of the first data mapping circuit 122 and the second data mapping circuit 123.

FIGS. 4 and 5 illustrate patterns of errors that occur in a memory chip 131 of a memory 130. In FIGS. 4 and 5, the hatched portion may represent a bit where an error has occurred.

Referring to FIG. 4, errors have occurred in 4 bits of data (e.g., BL0) of the four data pads DQ0 to DQ3 of the memory chip 131. When the symbols are mapped in the memory chip 131 as shown in FIG. 2, the errors may occur over four symbols, which are the 0th symbol to third symbol. That is, errors may occur in four symbols in the memory chip 131 only. When the symbols are mapped in the memory chip 131 as shown in FIG. 3, the errors may be included only in one symbol (i.e., the 0th symbol). In short, in the memory chip 131, an error may occur only in one symbol.

Referring to FIG. 5, an 8-bit error has occurred in data (e.g., BL0 to BL7) of the data pad DQ0 of the memory chip 131. When the symbols are mapped in the memory chip 131 as shown in FIG. 2, the errors may be included only in one symbol (i.e., the 0th symbol). When the symbols are mapped in the memory chip 131 as shown in FIG. 3, the errors may appear over the four symbols (i.e., the 0th symbol to the third symbol).

Referring back to FIG. 1, the mapping controller 126 may refer to the error detection history ERR_LOG that is stored in the error log circuit 124. Further, the mapping controller 126 may change the mapping between mapping circuit 122 and the second data mapping circuit 123 in such a manner that the number of symbols where an error occurs may be minimized in the memory 130. When a large number of errors of the pattern shown in FIG. 4 occur in the memory 130, the number of symbols where the errors occur may be reduced by changing the mapping between the first data mapping circuit 122 and the second data mapping circuit 123 as shown in FIG. 3. When a large number of errors of the pattern shown in FIG. 5 occur in the memory 130, the number of symbols where the errors occur may be reduced by changing the mapping between the first data mapping circuit 122 and the second data mapping circuit 123 as shown in FIG. 2.

The mapping controller 126 may change the mapping between the first data mapping circuit 122 and the second data mapping circuit 123 at a predetermined interval. The mapping controller 126 may change the mapping whenever the number of the accumulated errors exceeds a threshold value. The mapping controller 126 may apply the same mapping to the memory chips 131 to 148 in the memory 130. Alternatively, the mapping controller 126 may apply a different mapping to each of the memory chips 131 to 148. When the same mapping is applied to the memory chips 131 to 148, the error log circuit 125 may integratedly store the error occurrence histories of the entire memory chips 131 to 148 and the mapping controller 126 may determine the mapping based on them. When a different mapping is applied to each of the memory chips 131 to 148, the error log circuit 125 may individually store an error history for each of the memory chips 131 to 148 and the mapping controller 126 may individually determine the mapping for each of the memory chips 131 to 148 based on the individually stored error histories.

When the mapping controller 126 changes the mapping between the first data mapping circuit 122 and the second data mapping circuit 123, the command controller 127 may generate internal read and write commands of the memory module 120 and addresses corresponding to the internal read and write commands to read the dataword DATAWORD stored in the memory 130 and write the dataword DATAWORD back into the memory 130 according to the changed mapping method. When the mapping controller 126 changes the mapping between the first data mapping circuit 122 and the second data mapping circuit 123, the command controller 127 may generate read and write commands and addresses corresponding to the read and write commands. Thus, the dataword DATAWORD of the memory 130 is read and error-corrected according to the existing mapping method so as to generate a new error correction code ECC and then the generated error correction code ECC is written in the memory 130 according to the changed mapping method. The command controller 127 may repeatedly generate the read and write commands while changing the addresses so that all the data stored in the memory 130 may be re-written according to the changed mapping method.

Described herein is an example where when the command controller 127 exists in the memory module 120 and the mapping between the first data mapping circuit 122 and the second data mapping circuit 123 is changed, all the data stored in the memory 130 are re-written according to the changed mapping method. However, it is also possible to apply the technology of the present invention to an embodiment where the command controller 127 is not present in the memory module 120. When the command controller 127 does not exist in the memory module 120 and the mapping controller 126 changes the mapping, the changed mapping method is applied only from the dataword DATAWORD newly written in the memory 130 and the existing mapping method may still be applied to the data ward DATAWORD already written in the memory 130. However, in this case, metadata for representing which mapping method is used for the dataword DATAWORD stored in the memory 130 may be additionally stored in the memory 130.

Although FIG. 1 shows the memory module 120 includes the error correction code generation circuit 121, the first data mapping circuit 122, the second data mapping circuit 123, the error correction circuit 124, the error log circuit 125, the mapping controller 126, and the command controller 127, it is obvious to those skilled in the art that some or all of these may be included in other constituent elements in the memory system 100. For example, all or some of these constituent elements may be included in the memory controller 127, rather than the memory module 120.

According to the embodiments of the present invention, error correction efficiency of a memory system may be increased.

While the present invention has been described with respect to the specific embodiments, it will be apparent to those skilled in the art that various changes and modifications may be made without departing from the spirit and scope of the invention as defined in the following claims.

What is claimed is:

1. A memory system, comprising:
an error correction code generation circuit suitable for generating an error correction code including one or more symbols for write data including a plurality of symbols, to output a codeword including the write data and the error correction code;
a first data mapping circuit suitable for mapping the symbols of the codeword to a dataword;
a memory suitable for storing the dataword;
an error correction circuit suitable for receiving a dataword from the memory and correcting an error of data in the received dataword using the error correction code in the received dataword; and
a mapping controller suitable for determining a mapping method of the first data mapping circuit based on an error detection history of the error correction circuit,
wherein each of the symbols of the codeword is transferred to the memory through a single corresponding data pad based on a first mapping method, and
wherein each of the symbols of the codeword is transferred to the memory through a set of data pads when the mapping method of the first data mapping circuit is changed from the first mapping method to a second mapping method.

2. The memory system of claim 1,
further comprising:
a memory controller suitable for controlling a memory module, which includes the error correction code generation circuit, the first data mapping circuit, the memory, the error correction circuit and the mapping controller.

3. The memory system of claim 1, wherein the memory is included in a memory module, and the error correction code generation circuit, the first data mapping circuit, the error correction circuit and the mapping controller are included in a memory controller suitable for controlling the memory module.

4. The memory system of claim 1, further comprising:
an error log circuit suitable for storing the error detection history; and
a second data mapping circuit suitable for mapping the received dataword on a basis of a symbol which is required for an error correction operation of the error correction circuit.

5. The memory system of claim 4, wherein the mapping controller determines one of the first mapping method and the second mapping method as a mapping method of the second data mapping circuit.

6. The memory system of claim 1, further comprising:
a command controller suitable for performing a control to read the dataword stored in the memory and write the dataword back into the memory according to a changed mapping method, when the mapping controller changes the mapping of the first data mapping circuit.

7. The memory system of claim 1, wherein the memory further stores information on a mapping of the dataword.

8. The memory system of claim 1, wherein the memory includes one or more memory chips.

9. A memory module, comprising:
an error correction code generation circuit suitable for generating an error correction code including one or more symbols for write data including a plurality of symbols to output a codeword including the write data and the error correction code;
a first data mapping circuit suitable for mapping the plurality of symbols in the codeword to a dataword; and
a plurality of memory chips suitable for storing the dataword;
an error correction circuit suitable for receiving a dataword from the memory and correcting an error of data in the received dataword using the error correction code in the received dataword; and
a mapping controller suitable for determining a mapping method of the first data mapping circuit based on an error detection history of the error correction circuit,
wherein each of the symbols of the codeword is transferred to one of the memory chips through a single corresponding data pad based on a first mapping method, and
wherein each of the symbols of the codeword is transferred to one of the memory chips through a set of data pads when the mapping method is changed from the first mapping method to a second mapping method.

10. The memory module of claim 9, further comprising:
an error log circuit suitable for storing the error detection history; and
a second data mapping circuit suitable for mapping the received dataword on a basis of a symbol which is required for an error correction operation of the error correction circuit.

11. The memory module of claim 9, wherein the mapping controller determines one of the first mapping method and the second mapping method as a mapping method of the second data mapping circuit.

12. The memory module of claim 9, further comprising:
a command controller suitable for performing a control to read the dataword stored in the memory chips and write the dataword back into the memory chips according to a changed mapping method, when the mapping controller changes the mapping of the first data mapping circuit.

13. The memory module of claim 9, wherein at least one among the memory chips further stores information on a mapping of the dataword.

14. The memory module of claim 9, wherein the memory module includes of a dual in-line memory module (DIMM).

15. A memory module comprising:
an error correction code (ECC) encoding circuit suitable for generating an error correction code for the write data including one or more symbols for write data including a plurality of symbols, to output a codeword including the write data and the error correction code;
a data mapping circuit suitable for mapping the symbols of the codeword to a dataword according to a first mapping method;
a memory suitable for storing the dataword; and
a mapping controller suitable for detecting errors of the dataword, which is read from the memory and controlling the data mapping circuit to change the first mapping method into a second mapping method based on the detecting result,
wherein each of the symbols of the codeword is transferred to the memory through a single corresponding data pad based on the first mapping method, and
wherein each of the symbols of the codeword is transferred to the memory through a set of data pads when the mapping method is changed from the first mapping method to the second mapping method.

* * * * *